Sept. 23, 1941.    R. M. RING    2,256,527
INDICATING DEVICE
Filed June 17, 1939
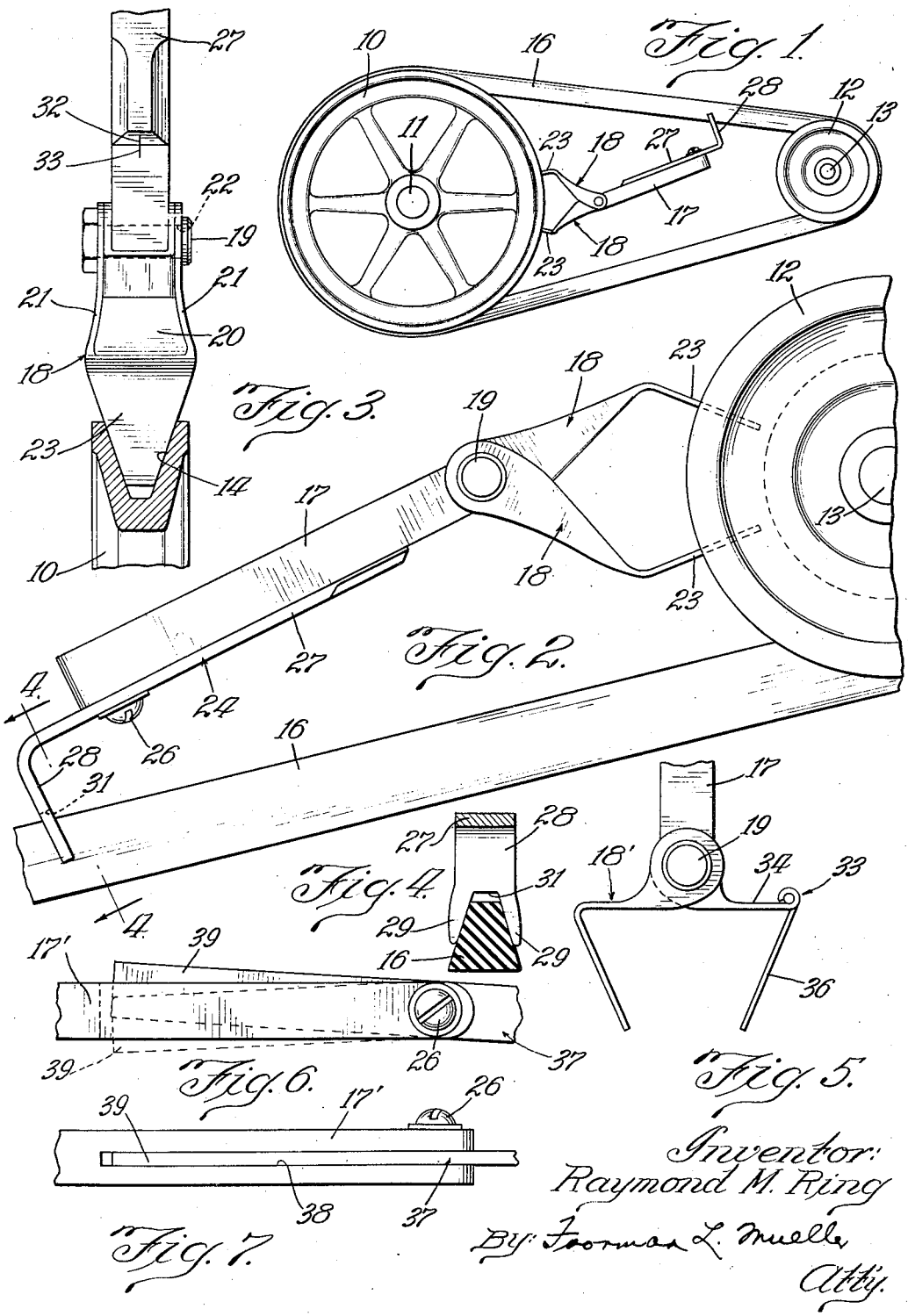
Inventor:
Raymond M. Ring
By: Foorman L. Mueller
Atty.

Patented Sept. 23, 1941

2,256,527

UNITED STATES PATENT OFFICE 2,256,527

INDICATING DEVICE

Raymond M. Ring, Chicago, Ill.

Application June 17, 1939, Serial No. 279,773

8 Claims. (Cl. 33—181)

My invention relates in general to a device for indicating alignment or misalignment between any two related objects, and more in particular to a device for indicating alignment or misalignment between a pulley or sprocket, and the belt or chain for the same.

In the case of a plurality of pulleys or sheaves which are connected together by belts or the like in an operating system, the operating efficiency of the structure is reduced and excessive wear occurs on the belts, or possibly on the pulleys or sheaves, when there is misalignment between a pulley or sheave and the belt thereon. In the case of such misalignment the belt rubs on the side of the groove in the sheave rather than tracking directly with such groove. This misalignment usually occurs upon the original installation of the shaft carrying the sheave. When installing sheaves and belts at the present time the usual procedure is to mount the two or more shafts which are to carry the sheaves, and then align the corresponding sheaves on the shafts by means of a straight edge across the grooves of the sheaves or by merely sighting across such grooves. When alignment under such procedure is determined, the shafts and associated structure are rigidly secured in mounted position. Even assuming that the original aligning procedure provides the corresponding sheaves in alignment, they are often moved from alignment as the shafts are tightened down. The belt or belts connecting the sheaves are then out of alignment with the grooves in the sheaves and cause undesirable wear and loss of power.

An object of my invention is to provide an improved device for indicating the original alignment of corresponding and associated rotating members, and which will continue to indicate alignment or misalignment during the installation of such members in a fixed axial position with reference to one another.

A further object of my invention is to provide a simple, and inexpensive, yet completely effective device for indicating alignment or misalignment between a rotatable member and a related moving connecting member therewith.

Another object of my invention is to provide an alignment or misalignment indicating device which can be carried in the hand, and provided in such a size that it can be readily introduced between two interconnected objects which are movable with respect to one another, such as a sheave or pulley and a belt thereon.

A still further object of my invention is to provide a device for indicating alignment or misalignment between two relatively moving objects such as a sheave and belt, which is simple and inexpensive, yet adapted in a single size to a relatively large number of different sizes for the moving objects.

One of the advantages of my invention is that it is light in weight and can be carried in the hand and quickly applied to a sheave and belt, or to a plurality of sheaves and belts in any position, such as the position where a belt is going onto a sheave, or in a position where a belt is coming off of a sheave, and in either position it will accurately and simply indicate the condition of alignment or misalignment between the sheaves and belts.

Another advantage of my indicating device is the fact that it may be easily read by a skilled or unskilled person, and is sturdy enough to stand substantially any type of rough handling.

Other objects and advantages of my invention will be apparent from the following description taken with the drawing, in which:

Fig. 1 is a side elevation of a sheave or pulley and belt system with the indicator device of my invention in one possible position for indicating alignment or misalignment between a sheave and the belt thereon.

Fig. 2 is an enlarged fragmentary view showing the device in another position with relation to a sheave and the pulley thereon.

Fig. 3 is a fragmentary front elevational view partly in section showing the centering portion of the device in position in a sheave groove.

Fig. 4 is a sectional view along the line 4—4 of Fig. 2 and looking in the direction of the arrows thereon.

Fig. 5 is a detail fragmentary view of a modification in the centering portion of the device.

Fig. 6 is a plan view of a fragmentary portion of the device showing a modification in the indicating structure therefor.

Fig. 7 is a side elevation of the structure of Fig. 5.

In practicing my invention I provide a sheave and belt alignment indicating device which can be carried in the hand and which includes a combination body portion and handle, with a centering portion at one end of the body portion adapted to be seated in the groove of the sheave to center the body portion with reference to the sheave groove. An indicator portion is movably mounted upon the body portion and extends in a direction opposite to the centering portion for centered engagement with the belt on the sheave. Due to the movability of the indicator portion centered on the belt it will take a position which is in alignment or parallel with the belt. By means of a pointer and scale arrangement as between the indicator portion and the body portion, or by other indicator means as between these two portions, the operator can immediately ascertain the alignment or misalignment of the belt with reference to the sheave with which the device is connected.

Referring now to the drawing, a representative sheave and belt system is illustrated in Fig. 1. This includes a sheave or pulley 10 secured to a shaft 11, and a sheave or pulley 12 secured to a shaft 13, which might very conveniently be a motor shaft. A V-shaped groove is provided in each sheave, and the two are connected by a V-shaped belt 16 in the usual manner. When installing the sheave and shaft structures of the complete system, the shafts and their associated structure must be mounted so that the grooves in the sheaves to be connected are in direct alignment. The complete system is often installed with a portion of the structure on the ceiling of the room and another portion on the floor, with both portions on the ceiling, or in many other positions as is well understood by those skilled in the art. The size and weight of the sheave and shaft as well as the associated structure is often such that it is bulky and difficult to handle, and even though care is taken to originally align two corresponding sheaves, the structure moves out of alignment during the actual fastening thereof in the position desired. As a result of this condition a belt such as 16 will rub on the side of a groove as 14 in the sheave rather than track properly in the groove causing undesirable friction between the sheave and belt and excessive wear on the latter. In addition, it can be readily seen that there may be a loss of power which is serious, or only somewhat serious, depending upon the degree of misalignment as between a sheave and the belt thereon. In making the installation the belt 16 can conveniently be looped over the sheaves 10 and 12 and the indicating device of my invention employed to originally align the sheaves and hence the shafts 7 and 13 to which they are secured, and during the fastening of the structure the indicating device can be watched to determine whether or not this alignment is maintained right up until the time that the sheaves and related structure are fixedly mounted in position.

As to the indicating device itself, this comprises an elongated body portion 17 which also serves as a handle to carry the indicating device in the hand of the operator. At one end of the body portion, a pair of similar fingers 18 are pivotally supported by a pivot pin 19 so as to be movable with reference to the body portion. Each finger 18 comprises a body portion 20 having a pair of ears 21 thereon which are apertured at 22 to fit over the pivot pin 19, and which lie on opposite sides of the body portion 17 as is clear from Fig. 3. An angular extension or tongue 23 on each body portion 20 and integral therewith, is V-shaped to correspond with the V-shape of the groove 14 of each of the sheaves 10 and 12 into which the tongues can be inserted.

The actual indicating is accomplished by an indicating portion of the device comprising a member 24 which is pivotally supported by a pivot pin 26, or the like, on the body portion 17. The member 24 comprises an indicating portion 27 in abutting relation with one of the faces of the body portion 17, and an arm portion 28 for engagement with the inside of the V-shaped belt as shown in Fig. 4. The arm 28 is formed substantially at right angles with the indicator portion 27, and includes a pair of prongs 29 defining a recess 31 corresponding in shape to the inside shape of the belt 16. The indicator portion 27 may be provided in the shape of a pointer, or preferably with a beveled nose having a line 32 cut therein to indicate an aligned position between a sheave and belt when it corresponds to a line 33 cut in the face of the body portion 17 as shown in Fig. 3.

In using the indicating device of my invention, it may be placed in any one of four positions with reference to a sheave and related belt, with one position being illustrated in Fig. 1. It is understood that the device may be turned over and repositioned with the arm 28 extending downwardly for engagement with the belt 16 rather than upwardly. A third position is that illustrated in Fig. 2 where the connection for indicating purposes is made between the sheave 12 and the belt 16. The indicating device may again be turned through 180° from the position of Fig. 2, to interconnect the top portion of the belt 16 and the sheave 12. For purposes of illustration the use and operation of the device will be described in the position illustrated in Fig. 1. One of the fingers 18 is first seated in the groove 14 of the sheave 10 with the body portion 17 in the approximate position of Fig. 1, so that the arm 28 is then in general engagement with the belt 16. The body portion is moved slightly to bring the tongue 23 of the finger 18 into fully seated position as shown in Fig. 3 and the other finger 18 is then pivoted with reference to the body portion 17 until it is in a similarly seated position. The seated position for each of the fingers 18 is such that the tongues 23 are approximately coextensive over their length with radial lines emanating from the center of the shaft 11. The recess 31 of the arm 28 is then brought into a full-seated position with the belt 16 as can be seen more clearly in Fig. 4, and when the seated position is attained the member 24 automatically becomes aligned or parallel with the belt 16. The member 24 is of course readily movable on the body portion 17 at the pivot pin 26. If the belt 16 is in alignment, or tracks properly with the groove 14 in the sheave 12, the lines 32 and 33 on the indicator portion of the member 24 and the body portion 17 respectively will coincide. If the belt and sheave are out of alignment, this will also be readily apparent.

A modification of the centering portion for the device is illustrated in Fig. 5. With the tongues 23 fixed with reference to the remainder of the fingers 18, a marked variation in the diameter of sheaves from one particular diameter will bring about a situation in which regardless of the adjustability of the fingers 18, with reference to the body 17, they still are not coextensive with radial lines from the sheave axis. To take care of this condition, I provide a jointed finger 33, as shown in Fig. 5, which is mounted on the pivot pin 19 together with a fixed finger 18' corresponding to that previously described. The finger 33 includes a body portion 34 and a tongue 36 adjustable relative to the body portion 34. The body portion 34 is movable relative to the portion 17 of the device. In using this modified structure, the finger 18 is first properly seated in the groove 14 of a sheave, and the finger 33 as a whole, with the tongue 36 thereon, are adjusted so that the tongue will seat in the groove of the sheave, and the tongue portions of each finger will lie approximately on radial lines from the center of the sheave.

A modification in the indicating portion is illustrated in Figs. 6 and 7. A body portion 17' for the indicating device is provided with an elongated recess 38 centrally thereof, and the member 37 is inserted therein to be pivotally connected with the body portion by a pin, screw, or the like, 26. The member 37 is provided with an arm (not shown) identical with the arm 28 shown in Fig. 2. The indicator portion 39 moving in and out of the recess 38 may be painted a brilliant color to be readily visible, and when the arm as 28 of the member is in engagement with a belt 16, misalignment between the belt and its related sheave is indicated by a showing of color on one side or the other of the body portion as can be understood from Fig. 7. When the belt and sheave are in alignment, the indicator portion 39 will be entirely within the recess 38 and no color will be visible.

Although I have illustrated and described my invention as embodied in an indicating device for a belt and sheave system, it is understood that the invention may also be embodied in an indicating device for similar structure such as a sprocket wheel and chain where the problem of alignment and wear are equally important. Furthermore, although I have described my invention in its preferred embodiments, it is understood that I do not limit the same thereby, but the invention is limited only by the scope of the appended claims.

I claim:

1. A device for indicating alignment or misalignment between a grooved pulley and a belt thereon, said device including a combination handle and body portion having a centering portion at one end thereof for engaging the groove in the pulley for centering the body portion with reference thereto, and means movably supported at the other end of said combination portion for engaging the belt and adapted to be centered thereon, said movable portion having an indicating portion therewith for indicating at the combination portion of the device the condition of alignment or misalignment as between said pulley and belt.

2. A device for indicating misalignment as between two different structures, said device including a combination handle and body portion, a pair of fingers adjustably mounted on said body portion adjacent one end thereof for centering the device with reference to one of said structures, and a member for centered engagement with the other of said structures movably supported on said body portion and movable with reference thereto to indicate misalignment between said structures.

3. A device for indicating alignment between a grooved pulley and a belt thereon, including in combination a body portion, a pair of movable fingers at one end of the body portion for centering in the groove of the pulley, and movable means supported at the other end of the body portion having a belt engaging portion for engaging the belt on the pulley, said movable means having means thereon for indicating alignment between the groove of the pulley and the belt thereon.

4. An indicator including two oppositely disposed engaging portions for centering with respect to structures to be aligned, a body portion intermediate said two portions, said body portion having a recess therein, and one of said engaging portions being movably mounted on said body portion with one end thereof positioned in said recess, said one engaging portion having an indication on said one end thereof to indicate misalignment between said two engaging portions when the indications thereon are visible outside of the recess of said body portion.

5. An alignment indicating device comprising a fixed member, centering means at one end of said fixed member adapted to center the device with reference to an object to be aligned, said centering means comprising a pair of fingers movably supported on said fixed member, with one of said fingers having a pair of portions operatively connected and movable relative to one another, and indicating means supported on said fixed member in a position spaced from said fingers to indicate the relative position between the indicating means and the fixed member.

6. A device for indicating alignment between a grooved sheave and the belt thereon including in combination a body portion, an indicator portion at one end of said body portion having a recess therein for engagement over the belt, a centering portion on said body portion oppositely disposed from said indicator portion and having a tongue thereon for insertion in the groove of said sheave.

7. A device for indicating alignment or misalignment between a wheel having an axis and a connecting member operatively supported for travel on the periphery of said wheel including a body portion having means at one end for centering said body portion in the plane of said wheel, means for engaging said connecting member pivotally mounted on said body portion adjacent the other end thereof, and second axis means mounting said engaging means on the body portion adjacent said other end, with said second axis means being at right angles to the axis of said wheel so that said engaging means pivots in a plane substantially at right angles to the plane of said wheel, and means for indicating the relative position of the engaging means and body portion.

8. A device for indicating alignment or misalignment between a grooved pulley and connector means operatively supported for travel over the periphery of said pulley, including in combination a body portion, means at one end of said body portion for setting in the groove of the pulley to align said body portion relative to the plane of said pulley, first axis means pivotally mounting said centering means on said body portion for pivotal movement in said plane, an engaging portion, second axis means at right angles to said first axis means pivotally mounting said engaging portion on said body portion at a position spaced from said one end, with said engaging portion having an extending end for engaging the connector means, and said engaging portion moving in a plane at right angles to the plane of said pulley, with one of said two portions having an indicator for indicating directly the amount of alignment or misalignment between said pulley and connector means.

RAYMOND M. RING.